United States Patent [19]

D'Agostino

[11] Patent Number: 4,714,421
[45] Date of Patent: Dec. 22, 1987

[54] QUICK-SWITCH MOLD SET WITH CLAMP MEANS

[75] Inventor: Nicholas D'Agostino, Pompton Lakes, N.J.

[73] Assignee: National Tool & Manufacturing Co., Inc., Kenilworth, N.J.

[21] Appl. No.: 13,641

[22] Filed: Feb. 11, 1987

[51] Int. Cl.$^4$ .............................................. B29C 45/26
[52] U.S. Cl. .................................. 425/192 R; 72/481; 100/918; 249/163; 425/195; 425/589
[58] Field of Search ............... 425/182, 195, 193, 190, 425/589, 192 R; 72/481, 482; 100/918; 164/180, 330; 249/160, 163

[56] References Cited

U.S. PATENT DOCUMENTS

| 4,105,385 | 8/1978 | Hehl | 425/192 R |
| 4,254,182 | 3/1981 | Netto | 425/182 |
| 4,519,309 | 5/1985 | Feirer | 100/918 |
| 4,557,792 | 12/1985 | Yamada et al. | 100/918 |

Primary Examiner—Willard E. Hoag
Attorney, Agent, or Firm—Ralph R. Roberts

[57] ABSTRACT

A quick-switch mold set is depicted wherein the interchangeable mold plate is carried by a T-plate slideable in grooves provided by a top clamping plate which is secured to the upper platen of the molding machine. A lower interchangeable mold plate is carried by an intermediate T-plate slideable in grooves provided in a bottom clamp housing. Removable and rotatable clamps are secured to the top clamping plate and other clamps to the bottom clamp housing. The clamps are disc-like, having two flats providing reduced portions that are positioned in way of a T-plate and mold plate during removal and interchange. The clamps are repositioned and tightened to provide the desired securement and retention of the mold plate and T-plate.

21 Claims, 7 Drawing Figures

QUICK-SWITCH MOLD SET WITH CLAMP MEANS

BACKGROUND OF THE INVENTION

1. Field of the Invention

With reference to the classification of art as established in and by the United States Patent Office, the present invention is believed to be found in the general class entitled "Plastic Article or Earthenware Shaping or Testing Apparatus," and more particularly in the subclasses pertaining to "with apparatus assembly or dismounting means or with idle part." Also of note is the subclass pertaining to "including securing means for retaining separable elements." The mold set of this invention is directed to injection-molding die sets and for portions which are readily removable and are retained with clamp means.

2. Description of the Prior Art

Injection molding and die sets used therewith are well known. The present injection processes propose and practically mandate that attendant time be reduced as much as possible. Short-run changes for molded articles are quite well known and necessary. The "down" or idle time for changeover in and for a machine costing several thousands of dollars and including the attendant's time are costly. For this reason, assured changeover with precise alignment is desired. This injection-molding process and apparatus has been the subject of many U.S. patents, among which are: U.S. Pat. No. 3,111,895 to KRAFT et al, as issued Nov. 26, 1963; U.S. Pat. No. 4,005,964 to BISHOP, as issued Feb. 1, 1977; U.S. Pat. No. 4,348,165 to VOSTROVSKY, as issued Sept. 7, 1982; U.S. Pat. No. 4,472,128 to RUHL, as issued Sept. 18, 1984, and U.S. Pat. No. 4,555,228 to NISHIIKE et al, as issued Nov. 26, 1985.

The patent to Kraft shows die clamp means, but does not pertain to injection molding with easy and rapid exchange of molding die portions. The patent to BISHOP pertains to ejecting and clamping apparatus, but does not utilize the rapid exchange method and apparatus of and as in the present invention. The patent to VOSTROVSKY shows a clamp means for die sections, but this clamp apparatus requires and shows hydraulic cylinders to actuate clamps for the dies. The patent to RUHL (U.S. Pat. No. 4,472,128), although for a locator clamp, has these clamps with springs and uses specially designed and machined holders. These clamps are designed to secure the upper and lower dies and the mold sets are not similarly formed. The U.S. Pat. No. 4,500,275, also to RUHL, uses wedge-shaped and screw-moved clamp means to provide precise location. These clamps are not and do not provide for the removing of portions of a die set initially secured. The patent to NISHIIKE et al is directed to the automotive exchange of complete mold sets.

The above and known patents and die sets do not disclose or teach a mold die set having upper and lower members that are disposed for securing to the molding machine apparatus and, when so placed and secured, the intermediate portions—including the plates into which the cavity is formed—are readily removable and new member portions may be inserted and mounted, then clamped.

SUMMARY OF THE INVENTION

This invention may be summarized, at least in part, with reference to its objects. It is an object of this invention to provide, and it does provide, a quick-switch mold set with clamping means providing selective exchange of the mold-forming portions by and with easy, manipulative and rapid exchange.

It is a further object of this invention to provide, and it does provide, a quick-switch mold set with clamp means in which there are at least two clamps which are substantially round with two flats. These clamps are sized and adapted for loosening and turning to a pass condition whereat the interchangeable "A" and "B" plates and associated T-plates are brought to a condition for removal. The associated T-plates, the leader pins and bushings are carried by and with the "A" (upper) and "B" (lower) interchangeable cavity plates. For identification and convenience of description, "A" is the upper plate and "B" is the lower cavity interchangeable mold plate.

An important improvement provided by the present invention is to provide a quick-switch mold set in which the top clamping plate and bottom clamping plate are secured to the molding machine, with the customary stationary and movable motion platens to perform in the customary manner. The quick-switch mold set of this invention includes a conventional locating ring and sprue bushing secured in a top clamp plate. This top clamp plate is also formed with like and parallel grooves for mounting and maintaining a T-plate having precisely positioned ears. "A" (upper) and "B" (lower) interchangeable mold plates are adapted to be formed with the desired cavity or cavities and in communication with the sprue of the nozzle to receive injected material. A clamp which is readily movable secures or releases the upper T-plate. The "B" interchangeable mold plate is maintained in alignment with four return pins and positioning is maintained with and by dowels and leader pins and bushings. The lower mold plate is moved in and out or up and down to extract or discharge the molded article. The upper plate is removably clamped to the molding machine apparatus. The bottom clamping housing is also removably clamped to the platen of the molding machine apparatus. The present invention permits and, in fact, anticipates that "A" and "B" interchangeable mold plates may be machined to provide the desired cavity or cavities and with associated T-plates be quick-switched and retained by clamping means.

This quick-switch mold set provides a sliding alignment of the "A" and "B" interchangeable mold-plate members by leader pins and bushings which are only maintained in and by these mold members. The "A" interchangeable mold plate provides the stop shoulder for an upper end of the leader pins, and the upstanding portions of the bottom clamping housing provide stop limits for the bushings for the leader pins.

In addition to the above summary, the following disclosure is detailed to insure adequacy and aid in understanding of the invention. This disclosure, however, is not intended to cover each new inventive concept no matter how it may later be disguised by variations in form or additions of further improvements. For this reason, there has been chosen a specific embodiment of the quick-switch mold set as adopted for use in and with injection mold machine apparatus and showing a preferred means for constructing said quick-switch mold set. This specific embodiment has been chosen for the purposes of illustration and description as shown in the accompanying drawings wherein:

BRIEF DESCRIPTION OF THE DRAWINGS

FIG. 5 B represents this same clamp rotated to a release position, and FIG. 5 C shows the structure of the screw, clamp and threaded securing member.

In the following description and in the claims, various details are identified by specific names for convenience. These names are intended to be generic in their application. Corresponding reference characters refer to like members throughout the several figures of the drawings.

Figure 4:
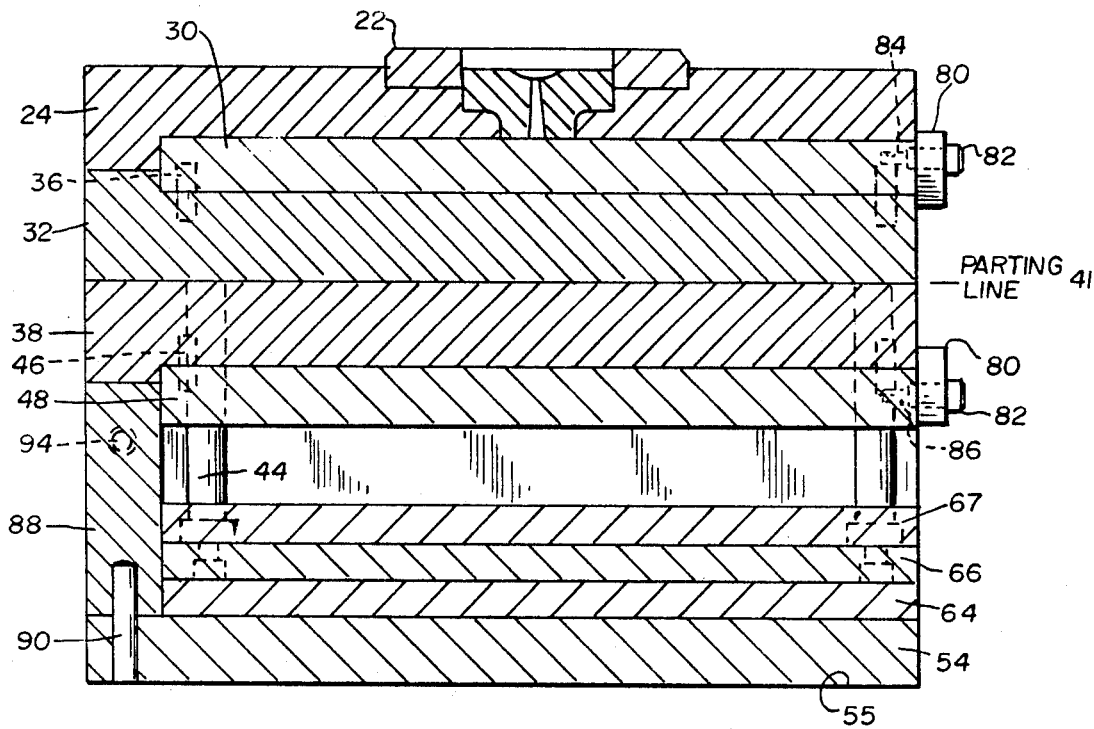
FIG. 4 represents a diagrammatic, side sectional view and illustrating the arrangement of the mold set in a closed condition, and FIGS. 5 A, 5 B and 5 C represent diagrammatic views of the clamp structure for retaining the quick-switch mold portions in place.

The drawings accompanying, and forming part of, this specification disclose details of construction for the purpose of explanation, but structural details may be modified without departure from the concept and principles of the invention and the invention may be incorporated in other structural forms than shown.

QUICK-SWITCH MOLD SET STRUCTURE AS SEEN IN FIG. 1

In the drawings for and with this application, it is to be realized that the mold set assembly is generally representative of a preferred mold construction. This view is partly diagrammatic so as to more clearly relate to the associated components. A sprue bushing 20 and locating ring 22 are depicted. The locating ring is retained in a top clamping plate 24 which is secured to a molding machine by clamps. The machine and clamps are not shown as they are conventional, but top clamping plate 24 is shown as having clamp-channel receiving slots 26. This top clamp plate is machined to provide "T" slots 28 for extending ears 29 of a top T-plate 30.

Figure 2:
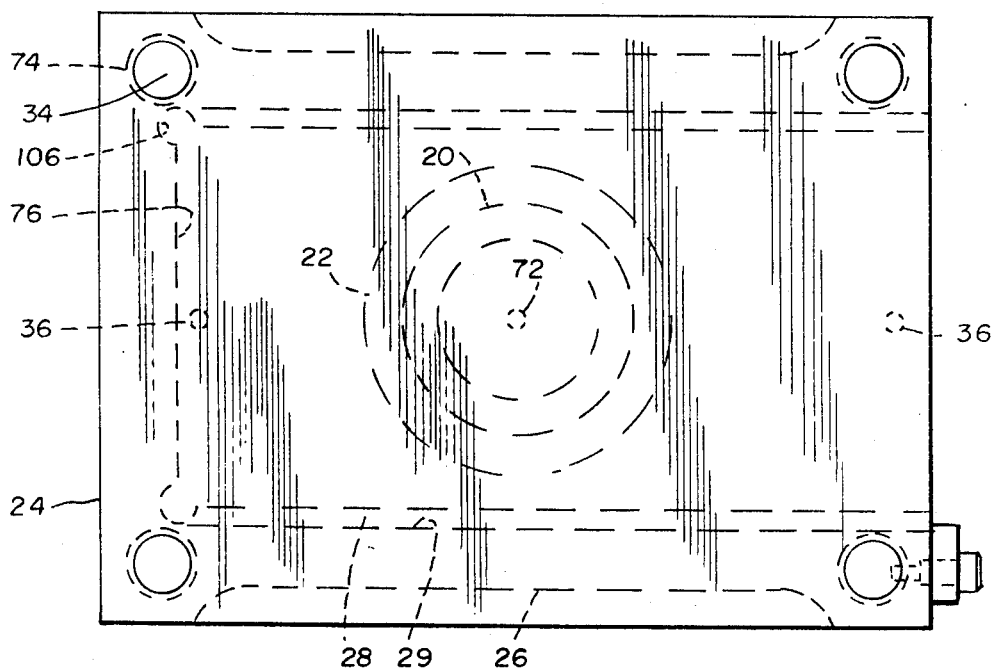
FIG. 2 represents a plan view, partly diagrammatic, and with this view taken from the parting line and looking toward the sprue bushing portion of the quick-switch mold set.

It is to be noted that T-plate 30 is formed to seat in and mate with an "A" interchangeable mold plate 32 which also is shown with orienting leader pins identified as 34. Also shown in dotted outline is locating dowel 36. This dowel 36 is tight in either T-plate 30 or "A" interchangeable mold plate 32. This dowel 36 and a like dowel at the opposite end are seen in FIG. 2. A mating "B" interchangeable mold plate 38 is finished so that the facing surfaces are sufficiently contiguous to provide a flow-stop for injected material. This plate 38 is depicted as having a leader pin bushing 40 sized and adapted to slide on each leader pin 34. The quick-switch mold set of this invention has a parting line, identified as 41, at the contiguous surfaces of "A" plate 32 and "B" plate 38. This parting line 41 is where the product is removed after molding. To the right of leader pin bushing 40 is formed a sliding aperture 42 for a return pin 44, to be described further. Intermediate leader pin bushing 40 and aperture 42 are depicted with a locating dowel 46 seen in dotted outline. Immediately below and seated partly in a provided recess in "B" interchangeable mold plate 38 is another T-plate identified as 48. This T-plate has extending tongue portions 50 slideable in grooves 52 formed and provided in bottom clamping plate 54.

This bottom clamping plate 54 has a support surface 55 by which the mold set is seated in the molding machine. The forming (machining) of this member also provides two oppositely disposed grooves 56 and 57 for clamping this mold set to the platen of the molding machine. The clamps are not shown, but are quite conventional to any and all mold operations. This bottom clamping plate 54 is also provided with an interior finished surface 58 which is extended to form grooves 59 and 60 sized and adapted to receive and retain the extending ear portions 62 and 63 of a core-pin plate 64. It is to be noted that this core-pin plate 64 is depicted as thinner than T-plates 30 and/or 48, but this is a matter of choice. Immediately above and moved by core-pin plate 64 are ejector plate 66 and ejector retainer plate 67. As depicted, said ejector retainer plate 67 has a plurality of counterbored holes 68 in which the headed end of return pin 44 is mounted and retained. Four cap screws 69 have their threaded shank portions entering and retained in and by threaded holes 70 in ejector retainer plate 67. This construction provides an easy method and means of construction providing retention of return pin 44.

QUICK-SWITCH MOLD SET STRUCTURE AS SEEN IN FIG. 2

Figure 3:
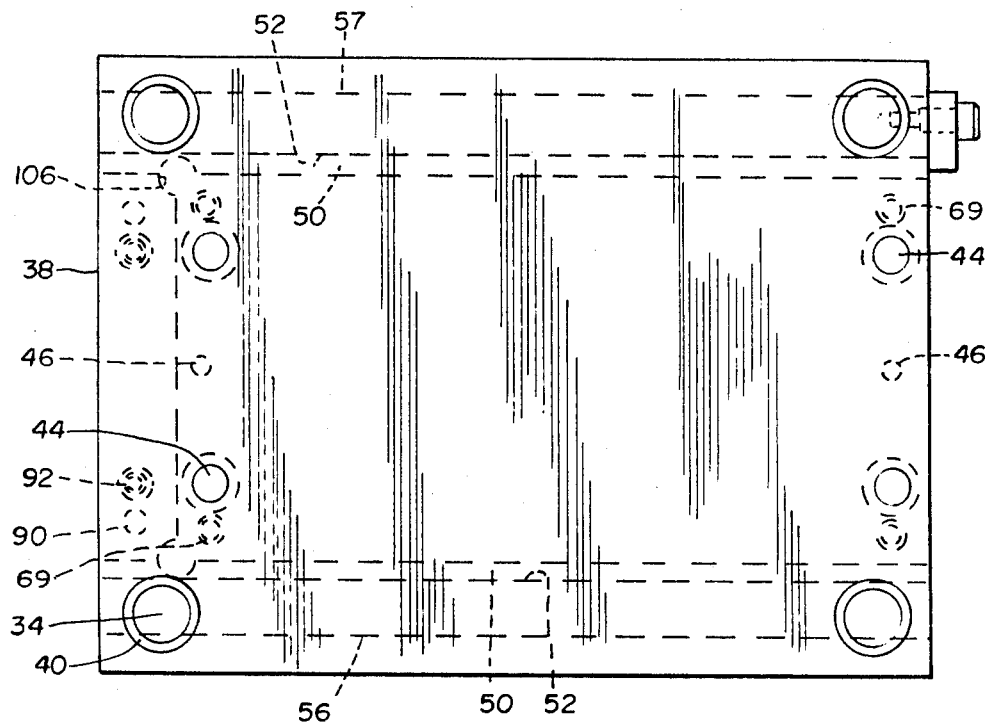
FIG. 3 represents a plan view, partly diagrammatic, and looking from the parting line downwardly.

This view is a plan view showing the quick-switch mold set assembly looking from the bottom surface 55 of bottom clamping plate 54 toward the sprue bushing 20. This view is partly diagrammatic as many of the components used in the mold set are not shown as these would only add to a confusion. This view is taken at the parting line 41 and looking toward the nozzle 20 and the locating ring 22. FIG. 3, which is described hereinafter, is also taken at the same parting line 41 looking downward toward the bottom clamping plate 54, but shows other details for completeness of descriptive explanation.

Figure 1:
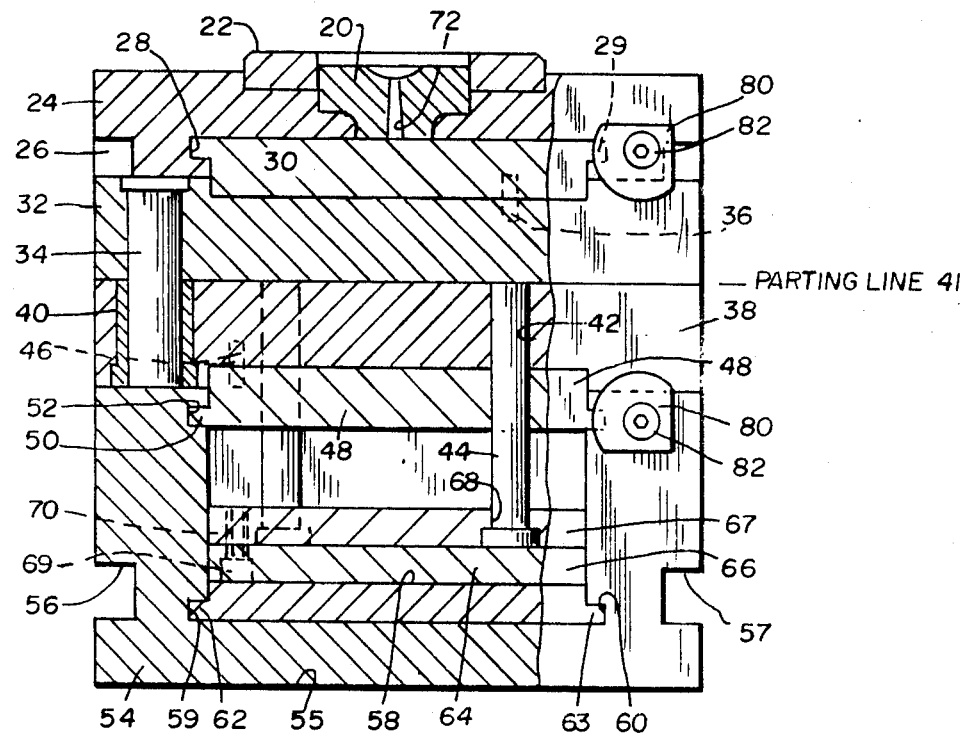
FIG. 1 represents a partly sectional side view showing the quick-switch mold set of this invention and with clamp means secured in position to restrain movement of a T-plate.

In FIG. 2, sprue bushing 20 is shown as mounted in locating ring 22, and also depicted is a tapered sprue hole 72 also seen in FIG. 1. This sprue hole also extends through T-plate 30 and the "A" interchangeable mold plate 32 to carry injected molten material to and into the formed cavity. It is to be noted that clamp slots 26 are formed in the long sides but are run out before the ends. The leader pins 34 are shown in solid outline, but are actually below and are hidden by top clamping housing 24. These pins have enlarged diameter head portions 74 shown in dotted outline. Bushing 40 is not seen as it is in the "B" plate 38. The showing of the formation of the T-plate grooves 28 and ears 29 is also like that for T-plates 48 and 64. It is to be noted that at the right the grooves and ears are terminated at dotted line 76, which is discussed more fully in connection with FIG. 4. Also seen in FIG. 2 are dowels 36 which maintain the mold plate 32 "A" upper interchangeable to the T-plate 30 so as to maintain alignment. As noted above, FIG. 2 is partly diagrammatic and many components are not shown.

QUICK-SWITCH MOLD SET STRUCTURE AS SEEN IN FIG. 3

In FIG. 3, the quick-switch mold set assembly is shown and looking downwardly toward the bottom clamping plate 54 and with the clamps and removable portions shown as to and at the right edge. It is to be noted that the quick-switch mold set assembly may be mounted in one of two positions in the molding machine for convenience of retention and operation. In FIG. 3, the view is looking downward from the parting line 41 and the four leader pins 34 are seen, with leader pin bushings 40 also depicted. In this view, four return pins 44 are seen and adjacent thereto are seen cap screws 69. Dowels 46 are also indicated as aligning T-plate 48 with "B" interchangeable mold plate 38. In this view are also shown grooves 52 in which the ear portions 50 of T-plate 48 are slideable and retained.

SECTIONAL VIEW OF FIG. 4

FIG. 4 is a sectional view of the quick-switch mold set of FIG. 3. As seen in this sectional view, which is also diagrammatic, is the locating ring 22 as seated in top clamping plate 24. Slideably and snugly retained between "A" interchangeable mold plate 32 and plate 24 is the top T-plate 30 which is movable to the right when clamp 80 is loosened and rotated. This clamp 80 is retained by a shouldered cap screw 82. The threaded end of said screw is retained in a stepped and threaded hole 84 (see FIG. 5 C) formed and provided in top clamping plate 24. A like clamp 80 and a screw 82 are carried by and in a stepped bore and threaded hole 86 formed in the upstanding portion of bottom clamping plate 54. It is to be noted that the top clamp housing 24 may have grooves 28 and 29 machined in the block of metal and with a full extent therethrough. When this procedure is followed, a stop limiting member providing a transverse closing member may be used. This transverse member is conventionally secured with dowels and cap screws to the top clamp housing 24. As seen in FIG. 3, bottom clamping plate 54 is machined to provide grooves 59 and 60 and a supporting surface 53 for T-plate 64. For the purpose of ease of machining, the bottom clamping plate 54 is machined through and that end opening in the base and opposite the clamp actuation is closed by a stop block 88 which is sized to fit within the machined space. Dowels 90 and adjacent cap screws 92 are shown in FIGS. 3 and 4 to secure the stop block 88 in the desired condition. Also seen in FIG. 4 is a cap screw 94 which may be utilized to secure stop block 88 in position.

As seen in the face view of FIG. 1 and in the FIGS. 2, 3 and 4, the top "A" interchangeable mold plate 32 and the bottom "B" interchangeable mold plate 38 are removably secured by means of clamps 80. This showing is merely for convenience as in reduced-to-practice conditions there are also provided two more like clamps 80 which are arrayed at the left and are symmetrical to a theoretical vertical center line. The additional clamps 80 insure and prevent unwanted skewing or cocking of the T-plates 30 and 48 as they are slid into and from the respective grooves. The view of FIG. 1, which is a diagrammatic showing, has the right portion illustrating the exterior arrangement but may have, and preferably has, the mirror image of the additional clamps 80 at the left portion. Two clamps may be used and, this is not to preclude such arrangements, but preferably four clamps 80 are used with each quick-switch mold set.

CLAMPS AS DEPICTED IN FIGS. 5 A, 5 B AND 5 C

Figure 5A:
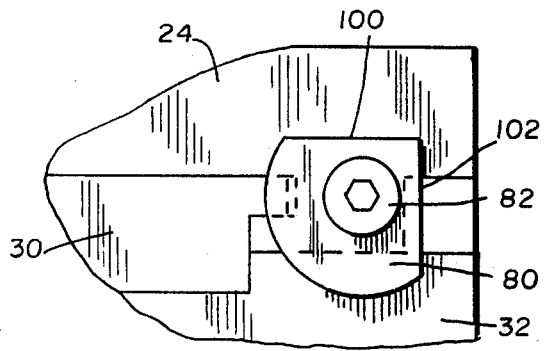
FIG. 5 A represents a clamp in securing condition by a hex-head shoulder screw.
Figure 5B:
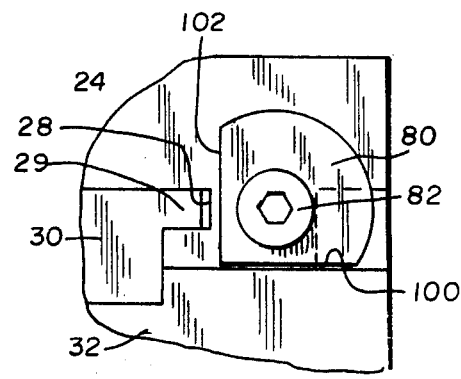
Figure 5C:
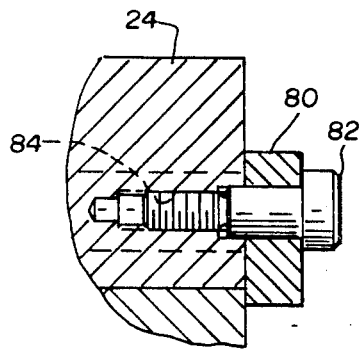

In the drawings of FIGS. 1 through 4, the clamps 80 are shown in a retaining condition whereat the cap screw 82 is in the tightened condition, with the outer larger diameter of the clamps 80 in engagement and retention of the extending ear 29 of T-plate 30. In FIG. 5 A, the clamps 80 are shown in a securing condition in which the diametrical extent portion is in way of the ear 29 of the T-plate 30. The flats 100 and 102 are at ninety degrees, and flat 102 is diametrically opposite the ear 29. These clamps 80 are shown with two adjacent flats 100 and 102 with about ninety degrees included angle.

In FIG. 5 B, the screw 82 has been loosened sufficiently for the clamps 80 to be rotated a half turn, with flat 102 uncovering ear 29, with a flat 100 adjacent the upper surface of plate 32. Plates 30 and 32 are in position to be removed. The flat 100 with this half turn uncovers the "A" interchangeable mold plate 32 so that T-plate 30 and "A" interchangeable mold plate 32 may be removed simultaneously. In FIG. 5 C, a sectional view is presented to illustrate the structure of the clamps 80 and cap screw 82. Flat 102 may also be brought to the position of ear 29 to unclamp the ear 29.

USE AND OPERATION OF EMBODIMENT OF FIGS. 1 THROUGH 5 C

As seen in FIGS. 1 and 4, the loosening and turning of the clamps 80 to a release position and condition allows removal of the T-plate 30 and the "A" and "B" interchangeable mold plates 32 and 34. Also released for removal are T-plate 48 and ejector plate 66 and ejector retainer plate 67, which are movable sideways because of the return pins 44. It is to be noted that clamps 80 are provided with each quick-switch mold set. One or two clamps 80 are mounted in respectively formed and positioned threaded holes made in the top clamping upper plate 24 and above leader pins 34. Like threaded holes 86 are also formed in the upstanding portions of the bottom clamp plate 54. One or two clamps 80 are utilized and are mounted and retained in threaded holes formed in the upstanding portions of bottom clamp plate 54. It is to be noted that the leader pins 34 and bushings 40 are short, and in the "mold-closed" condition these pins and bushings are in and extend only for the thickness of "A" and "B" interchangeable mold plates 32 and 38. It is to be noted further that the thicknesses of "A" and "B" interchangeable mold plates 32 and 38 are a matter of choice and are determined by the design requirement of the product. The leader pins 34 and bushings 40 are made to suit. It is to be noted that the pins 34 and bushings 40 are not retained in the secured mold members, top clamping plate 24 and bottom clamping plate 54. By and for this reason, this mold set is believed novel.

The clamps depicted are shown as washers with removed portions (flats) requiring a half-turn operation between clamping condition and the release condition. Each of the clamps 80 requires flats 100 and 102 to provide slide removal of the "A" and "B" interchangeable mold plates and these components. It is to be noted that the lower of the clamps 80 is reversed so that in clamped condition the flat 100 is toward the bottom clamp plate 54 and flat 102 is at the diametrically opposite position. A clamp washer with two flats is essential and is believed to be novel for the applied use.

The above-described quick-switch mold set, utilizing the two clamps 80, anticipates and provides separation of the "A" and "B" interchangeable mold plates 32 and 38 at the identified parting line 41 (FIG. 1). The upper clamping plate 24 and bottom clamping plate 54 are maintained in alignment by the guide rods or slides of the molding machine. The assembled quick-switch mold set is placed in the machine and clamped in the desired position. The quick-switch mold set portions, when clamps 80 are loosened and turned to the position of FIG. 5 B, permit the removal of the interchangeable insert portions, including T-plate 30, "A" and "B" interchangeable mold plates 32 and 38—including leader pins 34 and bushings 40, T-plate 48, return pins 44 and plates 66 and 67. The bottom clamping plate 54 and top clamping plate 24 remain secured. Replacement with another mold set for a different product is achieved easily, and securement with clamps 80 completes the procedure. This change is performed easily by the attendant.

It is also to be noted that modifications in forming the mold structure may be provided to accommodate machining and metal availability. For example, rather than make the top clamping plate as a unitary machined member, an additional plate member having a conformation providing the groove configuration may be secured to a flat plate and secured by dowels and cap screws. A composite structure of a top clamping plate structure will provide this desired configuration. The bottom clamping plate 54 may likewise be a composite assembly and, as shown in FIG. 4, is provided with an end member secured to a base member with dowels and screws. Strength and rigidity must be maintained to provide a satisfactory and accurate retainer, and minor modifications are contemplated, with the disclosed array as presented teaching the construction and use of the quick-switch mold set.

In FIGS. 3 and 4, the grooves for the T-plates are shown with arcuate pocket cutouts 106 which insure that unwanted debris which may enter the grooves during interchange, does not prevent full seating and clamping at the desired, precise position of the mold plates "A" and "B" which are interchanged with other like mold plates.

The dowel pins 36 and 46 are illustrated as being disposed not on the theoretical center line, but the placement is merely a matter of selection. These pins insure that precise mating and positioning is achieved. It is to be noted that T-plate 30 seats in a shallow recess in "A" interchangeable mold plate 32 and, in like manner, the intermediate T-plate 48 seats in a shallow recess in "B" interchangeable mold plate 38. The placement and securement of the dowels is preferably made when the securement of an associated T-plate and mold plate is to be made.

Terms such as "left," "right," "up," "down," "bottom," "top," "front," "back," "in," "out" and the like are applicable to the embodiment shown and described in conjunction with the drawings. These terms are merely for the purposes of description and do not necessarily apply to the position in which the quick-switch mold set may be constructed or used.

While a particular embodiment of the quick-switch mold set has been shown and described, it is to be understood that the invention is not limited thereto and protection is sought to the broadest extent the prior art allows.

What is claimed is:

1. A quick-switch mold set which is constructed so that a mold cavity may be formed in mold plates which are carried in that portion which is secured by selectively manipulable clamp means, this mold set having means for clamping in a selected position to upper and lower platens in molding apparatus, the quick-switch mold set having the quick-switch removable portion containing desired aligning means, the construction of the quick-switch mold set including:
  (a) a top clamping housing member adapted to receive and retain a sprue bushing including a nozzle-receiving means and a sprue passageway therethrough for molten material, said housing member including inwardly-facing grooves disposed in an opposed and facing position;
  (b) a first upper-T-plate having ear portions sized to be precisely slideably in the grooves in said top clamp housing member and with a stop limit for lateral movement of these ears of said T-plate in the grooves, and with said T-plate movable for interchanging mold sets in an in-and-out direction;
  (c) an upper interchangeable mold plate removably retained in the mold set and means for retaining alignment and positioning with said first T-plate;
  (d) a lower interchangeable mold plate selectively adapted to be brought to a contiguous face relationship and establishing a parting line with the upper mold plate, this mold plate also removably retained in this mold set for interchanging;
  (e) a plurality of leader pins and bushings arrayed and disposed to be retained in the upper and lower mold plates and maintain alignment during open and closed condition, these leader pins and bushings remaining with and as the upper and lower mold plates are removed for the interchange;
  (f) a bottom clamping housing having upstanding side portions extending upwardly to the leader pins and bushings and providing a stop surface for said pins and bushings, said bottom clamping housing side portions having inwardly-facing and opposed grooves;
  (g) a second intermediate T-plate having ear portions sized to be slideable in the opposed grooves in the side portions of the bottom clamping housing and with a stop limit for lateral movement of the T-plate provided by the side portion of the bottom clamping housing, and means for retaining said second lower mold plate in alignment with said intermediate T-plate;
  (h) a plurality of return pins disposed to be carried in and movable in holes in the intermediate T-plate and lower mold plate;
  (i) plate means for securing said plurality of return pins so as to maintain said return pins in a common plane and attitude during molding;
  (j) at least one upper clamp which is secured and carried by the top clamping housing and with said clamp disposed so as to be selectively movable from a tightened condition where said clamp retains the ear portion of the upper first T-plate and upper mold plate and, when loosened, is moved to a pass condition whereby said upper first T-plate and upper mold plate are adapted to pass said upper clamp when interchange is to be made, and
  (k) at least one lower clamp which is secured and carried by said bottom clamp housing and with said clamp disposed so as to be selectively movable from a tightened condition where said clamp retains an ear portion of the second intermediate T-plate and lower mold plate and, when loosened, this lower clamp is moved to a pass condition whereby said lower mold plate and second intermediate T-plate are adapted to pass said lower clamp when interchange is to be made.

2. A quick-switch mold set as in claim 1 in which the upper and lower clamps are disc-like with a determined thickness providing a desired rigidity, and with each clamp having about one-half as an arc with a selected origin or axis and the remaining as two flats with about a ninety-degree included angle, the clamps having a mounting bolt hole substantially at said axis and with said flats providing reduced extents from the axis, and when the flats are brought adjacent the ear portions of the T-plates the quick-switch portions of the mold set are in position for removal.

3. A quick-switch mold set as in claim 2 in which the upper clamp is carried by a cap screw whose threaded end is removably mounted and retained in a threaded hole formed in the top clamping housing.

4. A quick-switch mold set as in claim 2 in which the lower clamp is carried by a cap screw whose threaded end is removably mounted and retained in a threaded hole formed in an upstanding portion of the bottom clamping housing.

5. A quick-switch mold set as in claim 2 in which the inner facing surface of each of the disc-like clamps is made in and with a common plane, this surface, when the clamp is rotated so that the arc portion is presented to the T-plate and mold plate, is adapted to engage the ear portion of the T-plate and adjacent mold plate and, when tightened, retains the mold plate in the desired position.

6. A quick-switch mold set as in claim 1 in which the top clamping housing has an upper-plate portion and longitudinal side extents in which are formed the grooves for the first upper T-plate as an integrally supplied member of metal.

7. A quick-switch mold set as in claim 1 in which the bottom clamping housing has a bottom portion which is adapted to be clamped to the platen of the injection mold machine, and has longitudinal side extents in which are formed the grooves for the T-plate as an integrally supplied member of metal.

8. A quick-switch mold set as in claim 1 in which each of the return pins has heads which are seated in counterbored holes in a first plate and provide the means to maintain said pins in a common plane and attitude, and there is also provided a second plate which is secured to said first plate so as to maintain the head portions in said seated condition.

9. A quick-switch mold set as in claim 8 in which the securing of the first and second plates is by cap screws rotatably carried in said second plate and with the threaded shank portions thereof entering and seating in a secured position in threaded apertures formed in the first plate.

10. A quick-switch mold set as in claim 9 in which the second plate is supported on a third T-plate carried in grooves formed and provided in the side extents of the bottom clamping housing.

11. A quick-switch mold set as in claim 10 in which the third T-plate is slideable in said grooves and there is cooperative means provided by the bottom clamping housing and third T-plate to establish and provide a stop for longitudinal movement.

12. A quick-switch mold set as in claim 7 in which between the side extents of the bottom clamping member is a stop block fixedly secured to said bottom clamping member to provide a positive stop limit for the inward movement of the intermediate T-plate and the bottom T-plate.

13. A quick-swtich mold set as in claim 12 in which the securing of the stop block to the bottom clamping member and side extents is by dowels and screws.

14. A quick-switch mold set as in claim 1 in which the top clamping housing, and the grooves therein for the first T-plate, and the bottom clamping housing, and the grooves therein for the intermediate T-plate, are constructed to provide debris relief corners which prevent accumulation and also unwanted full insertion position for clamping of said interchange of mold sets.

15. A quick-switch mold set as in claim 1 in which there are four leader pins provided in each interchngeable mold set, each leader pin having a head and shank, each head removably mountable in a counterbore formed in said upper mold plate, and with each head having its top surface slideably positioned adjacent the top clamping housing and with the shank of each leader pin extending beyond the upper mold plate and slideable in a bushing carried in the lower mold plate.

16. A quick-switch mold set as in claim 15 in which each of the bushings which slideably retain each leader pin has a small shoulder and each bushing is seated in a counterbored hole formed in the lower mold plate, with the bushing when mounted having top and bottom surfaces which do not extend beyond the thickness of the lower mold plate.

17. A quick-switch mold set as in claim 16 in which the shoulder portion of each of the bushings is adapted to be slideably supported by an upper surface of the side extent of the bottom clamp housing.

18. A quick-switch mold set as in claim 1 in which the first upper T-plate and the upper mold plate are maintained in precise alignment by a plurality of dowel pins and the like, with portions of each dowel carried in the T-plate and upper mold plate, and with the inward limit of movement provided by the T-plate.

19. A quick-switch mold set as in claim 18 in which the means for retaining and alignment of the first upper T-plate and upper mold plate includes forming a shallow recess in the upper surface of the upper mold plate into which the first upper T-plate is fitted snugly.

20. A quick-switch mold set as in claim 1 in which the intermediate T-plate and lower mold plate are maintained in precise alignment plurality of dowel pins, with portions of each dowel carried in said T-plate and lower mold plate, and with the inward limit of movement provided by the T-plate.

21. A quick-switch mold set as in claim 20 in which the means for retaining and alignment of the intermediate T-plate and lower mold plate includes forming a shallow recess in the bottom surface portion of the lower mold plate into which the intermediate T-plate is fitted snugly.

* * * * *